Patented Aug. 14, 1945

2,382,297

UNITED STATES PATENT OFFICE 2,382,297

FLOOR COVERINGS

Martin E. Cupery, Wilmington, Del., assignor to E. I. du Pont de Nemours & Company, Wilmington, Del., a corporation of Delaware No Drawing. Application October 21, 1943, Serial No. 507,156

14 Claims. (Cl. 106—248)

This invention relates to gelled drying oils and, more particularly, to new products containing gelled oils, one form being linoleum type floor coverings.

Prior floor coverings of the linoleum type have usually been made with a binder or cement containing "linoxyn." This has been produced by oxidizing drying oils such as linseed oil by exposing them to air or by a boiling operation. The customary process has been to boil linseed oil for about 15 hours at temperatures of from 150° to 300° C., and then sprinkling it over long sheets of cotton scrim forming a film which is allowed to oxidize, and then repeating the process. The latter is very slow inasmuch as it requires about four to twelve weeks to build up a layer of oxidized oil about one inch thick. These oiled fabrics are hung in moderately heated ovens to complete the oxidation and polymerization of the oil, and the resulting linoxyn is used as the basis for the linoleum cement. Because of the slowness of this process some manufacturers have modified it by heating raw linseed oil, together with driers, in large vessels in which it is agitated and through which air is passed until the oil becomes so gelatinous that further agitation is difficult. Although this faster process requires about thirty hours, the resulting product still contains considerable unoxidized or uncoagulated oil even if gelation occurs.

The solidified oil is fluxed with resinous materials, such as rosin or kauri gum, until it has the proper consistency for use as linoleum cement. Because of the unoxidized oil, linoleums prepared from these cements have to be stored in heated ovens for from two to eight weeks to accomplish the coagulation or polymerization of the oxidized constituent, and to oxidize those portions of the linseed oil which still remain unoxidized in order to form a satisfactory linoleum.

The old procedure in making the cement has been further modified by adding an anticoagulant, such as a resin acid or resin ester, in the first oxidation process. This oxidizes a higher proportion of the oil before the coagulation, but this also requires about thirty hours to complete the reaction. The resin acid apparently retards the coagulation or agglomeration of the resulting oxidized products and allows more unsaturated components of the oil to be oxidized before gelation occurs, but it only reduces the required storing time by about 25 per cent.

It will thus be seen that the prior art methods of making this type of floor covering require a very considerable amount of time and usually result in incomplete oxidation.

I have discovered that new and improved gelled oils and floor coverings containing them can be prepared in considerably less time and with improved properties as set forth in the following specification.

It is therefore an object to provide new and improved gelled oils.

It is a further object to provide new and improved floor coverings.

Other objects will be apparent from a study of the specification and claims.

The above objectives have been accomplished by using polyhydric alcohol esters of polyunsaturated monocarboxylic acids having $\alpha,\beta$-ethylenic unsaturation conjugated with one or more other ethylenic double bonds. Those esters having only a portion of the alcohol groups esterified with the above unsaturated acids and remainder esterified with a different monocarboxylic acid or acids, preferably drying oil acids, are preferred.

Examples of these polyhydric alcohol esters and polyhydric alcohol mixed esters, and the methods of making them, are disclosed in my copending applications S. N. 372,391 and S. N. 372,393, of which the present application is a continuation-in-part, and in Rothrock S. N. 372,392 and Brubaker S. N. 372,394, all of which applications were filed on December 30, 1940.

My present invention involves the conversion of these and related synthetic drying oils into gelled oils, and the production of improved floor coverings from these gelled oils, as well as the resulting floor coverings themselves.

One of the preferred methods of carrying out the invention may be illustrated by using a $\beta$-(2-furyl)acrylic acid mixed glyceride $\beta$-(2-furyl)-acrylic acid is reacted with a glycerol partial ester of a long chain fatty acid, which is most suitably obtained by heating fatty oils in the usual way with glycerol and, preferably, an ester interchange catalyst. In this first alcoholysis step, the oil and free polyhydric alcohol, in proportions calculated to give the degree of alcoholysis desired, are preferably placed, along with a small amount of alcoholysis catalyst (e. g., 0.01–0.1% of sodium hydroxide based on oil), in a reactor fitted with an agitator, a device to measure the temperature, and a gas inlet. The mixture is then heated with stirring for 1 to 2 hours at 220–225° C., an oxygen free inert gas such as carbon dioxide or nitrogen being passed into and over the mixture. In the esterification step, this polyhydric alcohol partial ester is cooled to about 140–150° C., and β-(2-furyl)-acrylic acid is introduced in approximately the amount necessary to esterify the free hydroxyl groups calculated to be present from the initial proportions of oil and polyhydric alcohol. A mixed glyceride of linseed oil acids and β-(2-furyl) acrylic acid is obtained if linseed oil is used in the above reaction.

This mixed glyceride is converted into a gelled product by heating at 100–350° C. with vigorous stirring in the presence of a catalyst consisting of metallic drier, such as manganese rosinate (0.01 to 4% based on the oil), or by blowing air into the reaction mixture, heating and stirring being continued until the product has gelled. The time required to gel the oil is dependent upon the temperature, the catalyst, and on the rate of air blowing. At 290–300° C., under an inert atmosphere, gelation takes place in 1.5 hours without the aid of a catalyst. Linseed oil, under similar conditions, requires about 12 hours before gelation takes place. The gelled oils thus obtained can be compounded by milling with suitable fillers and coloring materials in appropriate proportions, metallic driers, such as manganese or cobalt rosinate, can be added to the mixture to improve the drying, and the milled mixture can be pressed onto an asphalt impregnated paper felt base to give a coating of any desired thickness. The assembly thus produced can then be cured at 65° C. until it is completely dry.

The more detailed practice of the invention is illustrated in the following examples wherein the amounts of the ingredients are by weight, such examples being given by way of illustration and not as a limitation. Where viscosity or color is given it is on the Gardner-Holdt Scale, and any hydroxyl number has been corrected for acidity. Where composition figures are given for the drying oil, it is understood that they represent an index to the proportion of the α,β-unsaturated acid used to prepare the mixed glyceride and do not mean the product actually contains the stated percentages of triglyceride. By a drying oil described as consisting of 20.4% of β-(2-furyl) acrylic glyceride and 79.6% of linseed acids glyceride, I mean that the proportion of reactants is so chosen that there would theoretically be obtained a mixture of the two mentioned glycerides in the stated proportions by weight. Actually this oil is considered to be composed principally of mixed glycerides, although small amounts of simple glycerides, partial glycerides (incompletely esterified glycerol) and free acids are undoubtedly present.

*Example 1*

Alkali-refined linseed oil, 1300 parts, is agitated with 69.4 parts of refined glycerol in an atmosphere of nitrogen at 250° C. for 1.5 hours. To 1010 parts of the di-glyceride thus prepared is added 226 parts β-(2-furyl) acrylic acid (Gibson & Kahnweiler, American Chemical Journal, vol. 12, page 314, 1890) and 50 parts of xylene. This mixture is agitated for 12 hours at 215–225° C. under an atmosphere of deoxidized nitrogen. The xylene and water which distill are condensed, the water separated, and the xylene returned to the reactor, these operations being conducted continuously. After the removal of solvent and unreacted acid, by holding at 150° C. and 5 mm. pressure for 1 hour, and subsequent filtration, there is obtained an oil, whose chemical composition is 20.4% of β-(2-furyl) acrylic glyceride and 79.6% of linseed acids glyceride, and has the following physical and analytical values: $N_D^{25}$, 1.4999; $d_4^{25}$, 0.9903; hydroxyl No. 13.8; iodine No. 184.1; saponification No. 216.5; acid No. 6.8; viscosity K; and color 4.8.

The oil obtained as described above is gelled by heating it at 300° C., with rapid stirring in a carbon dioxide atmosphere for 1½ hours. Sixty-five parts of a filler composed of whiting 28.6%, titanium dioxide 16.5%, Milori Blue (a ferric ferrocyanide dye) 2.0%, wood flour 52.9%, and 35 parts by weight of the gelled oil are milled together on a smooth mill at about 80° C. for 15 minutes, 2% of manganese rosinate (based on the oil) being added to improve the drying. The milled mixture is pressed onto an asphalt impregnated paper felt base to give a coating approximately 0.03" thick, and the assembly is then cured at 65° C. for 60 hours. Under similar conditions, linseed oil requires 12¾ hours before gelation takes place, and the compounded gelled oil, when spread as a film of 0.03" in thickness on an asphalt impregnated paper felt base, shows a slower toughening rate than that prepared with the oil described above.

*Example 2*

To 250 parts of the oil prepared as described in Example 1 is added 62.5 parts of rosin and 2.5 parts of litharge. This mixture is stirred vigorously and blown with air for 35 hours, maintaining a temperature of approximately 105° C. The gel thus obtained is formulated into a linoleum base as described in Example 1. The finished product is less tacky and has less odor than a control prepared using a linoxyn based on unmodified linseed oil.

*Example 3*

A linoleum base is prepared by incorporating 17.5 parts of rosin into 52.5 parts of the gelled oil of Example 1, and then milling into this mixture 130 parts of the filler mixture described in Example 1. This product cures more rapidly than a control prepared using a gelled linseed oil.

*Example 4*

A mixed glyceride of linseed oil acids in combination with α-methyl-β-(2-furyl) acrylic acid, prepared as described in Example 7 of copending patent application Serial Number 372,392, is gelled by heating it with stirring in a carbon dioxide atmosphere at 280° C. for 4 hours.

*Example 5*

A mixed β-(2-furyl) acrylic acid-soya bean oil acids glyceride, 250 parts, prepared as described in Example 9 of copending patent application Serial Number 372,392, and 62.5 parts of rosin is heated at 150° C. while blowing with air until the material has gelled. Sixty-five parts of a filler composed of lithopone 25.0%, iron oxide 18.0%, wood flour 27.0%, and ground cork 30.0% are milled together on a smooth mill with 35 parts of the gelled oil prepared as described above. The milled mixture is pressed onto an asphalt paper felt base to give a coating approximately 0.04" thick and the linoleum base thus prepared is then heated at 65° C. until completely dry.

*Example 6*

To 74 parts of linseed oil diglyceride, prepared as described in Example 1, are added 21 parts of α-vinylcinnamic acid (Kuhn and Ishikawa Ber. 64, 2347 (1931) ) and 10 parts of toluene, and the mixture refluxed for 8 hours at 200° to 220° C. in an apparatus equipped to allow the condensation of toluene and water of esterification, separation of the water, and return of toluene to the reaction vessel. The resulting mixed glyceride is then heated for 1 hour at 150° C. under a pressure of 20 mm. to remove the toluene, cooled, and filtered. This mixed glyceride has the following composition: Glyceride of α-vinylcinnamic acid 24.2%, glyceride of linseed acids 75.8%. A gel of this oil is prepared by heating in a carbon dioxide atmosphere for 1¾ hours at 280–290° C. The gel is formulated into a linoleum base, as described in Example 5, which cures more rapidly than a similar linoleum base made by using linoxyn prepared from unmodified linseed oil.

*Example 7*

A mixed hexadien-2,4-oic acid-linseed acids glyceride, prepared from linseed oil, glycerol, and hexadien-2,4-oic acid, as described in Example 2 of copending patent application Serial No. 372,391, is gelled by heating at 288° C. for 45 minutes. The gelled oil is formulated into a linoleum base composition as described in Example 1 and cured at 70° C. until thoroughly dried.

*Example 8*

A mixed glyceride of cinnamalacetic acid and linseed oil acids, prepared as described in Example 1 of copending patent application Serial Number 372,394, is heated at 290° C. for 12 minutes, after which a light-colored gelled oil is obtained. This composition is formulated into a linoleum base as described in Example 1. The product is found to dry more rapidly than a similar material made with linoxyn prepared from unmodified linseed oil.

*Example 9*

A mixed glyceride of 2-cyanohexadien-2,4-oic acid and linseed oil acids, prepared as described in Example 1 of copending patent application Serial Number 372,393, is gelled by heating at 250° C. for 3 hours. The gelled oil is formulated into a linoleum base as described in Example 1 and found to dry more rapidly than a similar material made with linoxyn prepared from unmodified linseed oil.

One of the advantages obtained in using synthetic drying oils is the saving in time required to effect gelling, and the more rapid through-drying of the finished products containing the said gelled oils. Another advantage is the superior hardness and water resistance of the cured products formulated with these gelled oils. A further advantage is that the above mentioned synthetic oils give finished products which show no appreciable shrinkage at the seams on aging, compared with ordinary linoxyn products which usually show objectionable spreading of the seams.

Any polyhydric alcohol ester of a polyunsaturated monocarboxylic acid or acids having α, β-ethylenic unsaturation conjugated with one or more other ethylenic double bonds can be used in this invention. Those esters having only a portion of the alcohol groups esterified with the above unsaturated acid or acids and the remainder esterified with a different monocarboxylic acid or acids, preferably drying oil acids, are preferred in the practice of this invention.

The α, β-ethylenic acids, in addition to those cited in the examples, that may be used for the preparation of the ungelled esters include, among others, 2-methylhexadien-2,4-oic acid

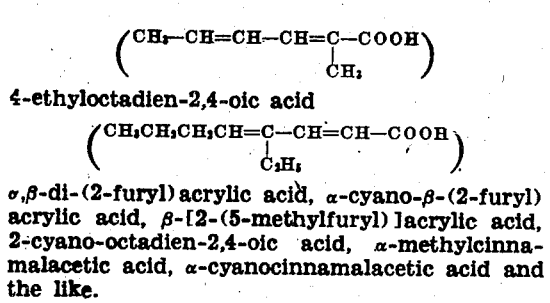

4-ethyloctadien-2,4-oic acid

α,β-di-(2-furyl)acrylic acid, α-cyano-β-(2-furyl)acrylic acid, β-[2-(5-methylfuryl)]acrylic acid, 2-cyano-octadien-2,4-oic acid, α-methylcinnamalacetic acid, α-cyanocinnamalacetic acid and the like.

The monocarboxylic acid or acids, other than those described above, that can used for preparing the ungelled mixed esters can be any monocarboxylic acid of different structure, or a mixture of such acids. Specific acids that can be used include linseed oil acids, China-wood oil acids, cottonseed oil acids, soya bean oil acids, perilla oil acids, oiticica oil acids, furoic acid, crotonic acid, phenoxyacetic acid, oleic acid, stearic acid and the like. However, the acids of drying or semi-drying oils are preferred.

Any polyhydric alcohol can be used for the preparation of the esters used in this invention. Suitable polyhydric alcohols include ethylene glycol, diethylene glycol, triethylene glycol, hexamethylene glycol, decamethylene glycol, glycerol, butanetriol-1,2,3, heptanetriol-1,4,7, erythritol, and methyl trimethylol methane. The preparation of these mixed esters is disclosed in detail in copending patent applications Serial Numbers 372,391; 372,392; 372,393; and 372,394.

The desired proportions of, for example, β-(2-furyl)-acrylic glyceride are normally obtained by using the calculated amount of β-(2-furyl)-acrylic acid or esterifiable derivative thereof. However, an effect which approaches or equals the behavior of the mixed esters so made can be obtained by preparing the mixed ester of a β-furylacrylic glyceride content higher than that desired, and blending it with the drying oil whose acids are being used (or a different oil if desired) in an amount calculated to give a mixed ester of the desired β-furylacrylic glyceride content. The best results are usually obtained by blending under conditions properly conducive to some ester interchange, for example, the heating of the two oils, with stirring and in an oxygen free inert gas atmosphere, for about 0.5 hr. at about 200° C.

The oils referred to above can be converted into gelled or oxidized products by the process used for the preparation of "scrim oil" or by heating them in large vessels with vigorous agitation. If the latter process is used, catalysts such as the oxides of lead, manganese, nickel, cobalt, zinc, cadmium, or their rosinates or linoleates can be used. However, the use of these catalysts is not essential. The oxidation or polymerization of the oil can be carried out by heating up to 350° C. if desired, or any lower temperature, with or without added catalyst, and with or without air blowing, depending upon the results desired. If a light colored gelled oil is desired, it is preferred to carry out the reaction in an inert atmosphere attained by passing deoxidized nitrogen or carbon dioxide into and over the mixture.

These gelled oils are preferably modified with a substantial proportion of resinous materials before use as a linoleum cement. A wide variety of suitable resinous materials are available, among which may be mentioned rosin, ester gum, fused Congo, Congo esters, kauri gum, coumarone resins, oil soluble or oil reactive synthetic resins of the phenol-aldehyde type which may in turn be modified with rosin, etc. Usually wood rosin will be found to be the most desirable since it is inexpensive, uniform in quality and readily soluble in the oil. The choice of modifier may vary depending upon the purpose to which the product is to be put. These resinous materials can be incorporated into the oil base prior to the oxidation treatment. The presence of these resins facilitates the oxidation of the oil and also markedly improves the toughness of the final product. It is not necessary, however, to incorporate these resins into the oil prior to oxidation, since good results can also be obtained by first preparing the oxidized oil in a manner described above and then adding thereto the selected resin.

In order to convert the gelled oil composition into a material suitable for use in the preparation of floor coverings, it is desirable to modify it by the addition of pigments and fillers. Suitable pigments, among others, that can be used include white lead, zinc white, lithopone, whiting, China clay, and chromates of lead, barium, or zinc, mercuric sulfide, iron oxides, Prussian blue, carbon black, and the like, either alone or in various combinations. Suitable fillers, in addition to these, include ground cork, wood flour, asbestos, and the like.

The particular fillers and pigments and proportions thereof employed can be arrived at readily by any one skilled in the art.

The products of this invention have extremely varied uses depending on the ratio of binder and filler and the presence of other materials, such as resins and pigments. They can be used for the preparation of linoleum cement, as cement for cork gasket compositions, in the manufacture of oil-cloth, oil silk, sandpaper and other abrasive products, and the like. Due to the variety of products which can be obtained by varying the filler and binder ratios, products can be obtained which are useful for many purposes, such as shoe insoles and counters, heat insulating and acoustic tile, polishing wheels, vibration dampers, and knife handles.

It is apparent that many widely different embodiments of this invention may be made without departing from the spirit and scope thereof; and, therefore, it is not intended to be limited except as indicated in the appended claims.

I claim:

1. A floor covering, comprising an asphalt impregnated paper felt base and a coating therefor containing a gelled polyhydric alcohol mixed ester of a poly-unsaturated monocarboxylic acid having $\alpha,\beta$-ethylenic unsaturation conjugated with at least one other ethylenic double bond and the acids of a natural drying oil and a pigmented filler.

2. A floor covering, comprising an asphalt impregnated paper felt base and a coating therefor containing a gelled polyhydric alcohol mixed ester of a hexadien-2,4-oic acid and the acids of a natural drying oil and a pigmented filler.

3. A floor covering, comprising an asphalt impregnated paper felt base and a coating therefor containing a gelled polyhydric alcohol mixed ester of a $\beta$-furylacrylic acid and the acids of a natural drying oil and a pigmented filler.

4. A floor covering, comprising an asphalt impregnated paper felt base and a coating therefor containing a gelled polyhydric alcohol mixed ester of $\beta$-(2-furyl)acrylic acid and the acids of a natural drying oil and a pigmented filler.

5. A floor covering, comprising an asphalt impregnated paper felt base and a coating therefor containing a gelled polyhydric alcohol mixed ester of a polyunsaturated monocarboxylic acid having $\alpha,\beta$-ethylenic unsaturation conjugated with at least one other ethylenic double bond and the acids of a natural drying oil and a filler composed of whiting, titanium dioxide, Milori Blue, and wood flour.

6. A floor covering, comprising an asphalt impregnated paper felt base and a coating therefor containing a gelled polyhydric alcohol mixed ester of a hexadien-2,4-oic acid and the acids of a natural drying oil and a filler composed of whiting, titanium dioxide, Milori Blue, and wood flour.

7. A floor covering, comprising an asphalt impregnated paper felt base and a coating therefor containing a gelled polyhydric alcohol mixed ester of a $\beta$-furylacrylic acid and the acids of a natural drying oil and a filler composed of whiting, titanium dioxide, Milori Blue, and wood flour.

8. A floor covering, comprising an asphalt impregnated paper felt base and a coating therefor containing a gelled polyhydric alcohol mixed ester of $\beta$-(2-furyl)acrylic acid and the acids of a natural drying oil and a filler composed of whiting, titanium dioxide, Milori Blue, and wood flour.

9. The method of making a floor covering, which comprises gelling a polyhydric alcohol mixed ester of a polyunsaturated monocarboxylic acid having $\alpha,\beta$-ethylenic unsaturation conjugated with at least one other ethylenic double bond and the acids of a natural drying oil by heating, mixing this with a pigmented filler, pressing onto an asphalt impregnated paper felt base to give a coating of the desired thickness, and curing.

10. The method of producing a gelled synthetic drying oil, which comprises reacting a polyhydric alcohol with a polyunsaturated monocarboxylic acid having $\alpha,\beta$-ethylenic unsaturation conjugated with at least one other ethylenic double bond and the acids of a natural drying oil, and heating at 100° to 350° C. with vigorous stirring in the presence of a metallic drier catalyst.

11. The method of producing a gelled synthetic drying oil, which comprises reacting a polyhydric alcohol with a polyunsaturated monocarboxylic acid having $\alpha,\beta$-ethylenic unsaturation conjugated with at least one other ethylenic double bond and the acids of a natural drying oil, and blowing with air at 100° to 350° C. with vigorous stirring.

12. A gelled polyhydric alcohol mixed ester of polyunsaturated monocarboxylic acid having $\alpha,\beta$-ethylenic unsaturation conjugated with at least one other ethylenic double bond and the acids of a natural drying oil.

13. A gelled polyhydric alcohol mixed ester of a $\beta$-furylacrylic acid double bond and the acids of a natural drying oil.

14. A gelled polyhydric alcohol mixed ester of a hexadien-2,4-oic acid and the acids of a natural drying oil.

MARTIN E. CUPERY.